US011240274B2

(12) United States Patent
Correnti et al.

(10) Patent No.: US 11,240,274 B2
(45) Date of Patent: Feb. 1, 2022

(54) MONITORING SYSTEM FOR SECURING NETWORKS FROM HACKER DRONES

(71) Applicant: Alarm.com Incorporated, Tysons, VA (US)

(72) Inventors: Matthew Daniel Correnti, Reston, VA (US); Michael Kelly, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/230,816

(22) Filed: Dec. 21, 2018

(65) Prior Publication Data

US 2019/0199756 A1   Jun. 27, 2019

Related U.S. Application Data

(60) Provisional application No. 62/609,329, filed on Dec. 21, 2017.

(51) Int. Cl.
   *G06F 11/00*   (2006.01)
   *G06F 12/14*   (2006.01)
   (Continued)

(52) U.S. Cl.
   CPC .......... H04L 63/205 (2013.01); G06N 20/00 (2019.01); G08B 13/19613 (2013.01);
   (Continued)

(58) Field of Classification Search
   CPC . H04L 63/1491; H04L 63/205; H04L 63/101; H04L 63/1408; H04W 12/08; G06N 20/00
   See application file for complete search history.

(56) References Cited

U.S. PATENT DOCUMENTS 8,854,465 B1 * 10/2014 McIntyre ............. G07C 5/0891
                                                              348/148
9,087,451 B1    7/2015 Jarrell
(Continued)

FOREIGN PATENT DOCUMENTS

DE    102007062603    7/2009
WO    WO2017042403    3/2017
WO    WO2017139001    8/2017

OTHER PUBLICATIONS

Truong et al., "Preventing Camera Recording by Designing a Capture-Resistant Environment," Ubiquitous Computing, Springer-Verlag Berlin Heidelberg, 2005; Lecture Notes in Computer Science, vol. 3660, p. 73-86.
(Continued)

*Primary Examiner* — Phy Anh T Vu
(74) *Attorney, Agent, or Firm* — Fish & Richardson P.C.

(57) ABSTRACT

Methods, systems, and apparatus, including computer programs encoded on a storage device, for securing a network associated with a property in response to the detection of a hacking drone within a vicinity of the property. In one aspect, a method includes obtaining sensor data from one or more sensors located at a property, detecting, based on the obtained sensor data, the presence of a drone, determining, based on the obtained sensor data, that the detected drone is an unauthorized drone, determining, by the monitoring system, that the unauthorized drone (i) is communicating or (ii) attempting to communicate with a network associated with the property, selecting one or more network adjustment policies, and transmitting one or more instructions to (i) one or more monitoring system components or (ii) one or more network components that are configured to adjust network parameters based on the one or more selected network adjustment policies.

18 Claims, 3 Drawing Sheets

(51) Int. Cl.

| | | |
|---|---|---|
| *G06F 12/16* | (2006.01) | |
| *G08B 23/00* | (2006.01) | |
| *H04L 29/06* | (2006.01) | |
| *G06N 20/00* | (2019.01) | |
| *H04W 12/08* | (2021.01) | |
| *G08B 13/196* | (2006.01) | |
| *G08B 29/18* | (2006.01) | |
| *G08B 25/00* | (2006.01) | |
| *H04W 12/03* | (2021.01) | |
| *H04W 12/122* | (2021.01) | |
| *H04W 12/79* | (2021.01) | |

(52) U.S. Cl.
CPC . *G08B 13/19645* (2013.01); *G08B 13/19697* (2013.01); *G08B 25/009* (2013.01); *G08B 29/186* (2013.01); *H04L 63/101* (2013.01); *H04L 63/1408* (2013.01); *H04L 63/1491* (2013.01); *H04W 12/03* (2021.01); *H04W 12/08* (2013.01); *H04W 12/122* (2021.01); *H04L 63/1416* (2013.01); *H04W 12/79* (2021.01)

(56) References Cited

U.S. PATENT DOCUMENTS

| | | | |
|---|---|---|---|
| 9,672,727 B1 | 6/2017 | Alexander et al. | |
| 9,767,699 B1 | 9/2017 | Borghese | |
| 9,773,422 B2 | 9/2017 | Wouhaybi et al. | |
| 9,858,947 B2 | 1/2018 | Hearing et al. | |
| 10,137,984 B1* | 11/2018 | Flick | G05D 1/102 |
| 11,017,680 B2 | 5/2021 | Trundle et al. | |
| 2004/0075547 A1* | 4/2004 | Vojtech | G08B 13/1966 340/500 |
| 2004/0186739 A1 | 9/2004 | Bolles et al. | |
| 2005/0012640 A1* | 1/2005 | Kong | G08C 17/02 340/870.17 |
| 2006/0133612 A1* | 6/2006 | Abedi | H04K 1/00 380/270 |
| 2008/0025229 A1* | 1/2008 | Beliles | H04L 63/1433 370/245 |
| 2008/0033604 A1 | 2/2008 | Margolin | |
| 2009/0243852 A1 | 10/2009 | Haupt et al. | |
| 2010/0077456 A1* | 3/2010 | Drive | G06Q 10/10 726/4 |
| 2010/0077483 A1* | 3/2010 | Stolfo | H04L 63/1466 726/24 |
| 2014/0277852 A1 | 9/2014 | Lundqvist et al. | |
| 2014/0306799 A1 | 10/2014 | Ricci | |
| 2014/0347675 A1 | 11/2014 | Romashkin | |
| 2015/0049189 A1* | 2/2015 | Yau | G08B 13/19697 348/143 |
| 2015/0112885 A1 | 4/2015 | Fadell et al. | |
| 2015/0254988 A1 | 9/2015 | Wang et al. | |
| 2015/0302858 A1 | 10/2015 | Hearing | |
| 2015/0321758 A1 | 11/2015 | Sarna, II | |
| 2015/0339912 A1 | 11/2015 | Farrand | |
| 2016/0029315 A1* | 1/2016 | Kates | G06F 1/3209 340/584 |
| 2016/0125713 A1 | 5/2016 | Blech | |
| 2016/0180719 A1* | 6/2016 | Wouhaybi | G08G 5/0069 701/4 |
| 2016/0191559 A1* | 6/2016 | Mhatre | G06F 12/14 726/23 |
| 2016/0225264 A1 | 8/2016 | Taveira | |
| 2016/0253907 A1 | 9/2016 | Taveira | |
| 2017/0019644 A1* | 1/2017 | K V | B64C 39/02 |
| 2017/0039413 A1 | 2/2017 | Nadler | |
| 2017/0076610 A1 | 3/2017 | Liu | |
| 2017/0092138 A1 | 3/2017 | Trundle et al. | |
| 2017/0134895 A1 | 5/2017 | Rabb | |
| 2017/0166325 A1* | 6/2017 | Gao | H04N 9/3185 |
| 2017/0183096 A1 | 6/2017 | Meinhart | |
| 2018/0024236 A1 | 1/2018 | Zorea | |
| 2018/0080747 A1 | 3/2018 | Nishikata | |
| 2018/0095155 A1* | 4/2018 | Soni | G08G 5/0086 |
| 2018/0276998 A1 | 9/2018 | Yu | |
| 2018/0281946 A1* | 10/2018 | Obaidi | G08G 5/006 |
| 2018/0314251 A1* | 11/2018 | Kamalakantha | B64C 39/024 |
| 2019/0025822 A1* | 1/2019 | Sentosa | G08B 13/19602 |

OTHER PUBLICATIONS

United States Non-Final Office Action in U.S. Appl. No. 15/282,216, dated Mar. 26, 2020, 16 pages.

Extended European Search Report in European Application No. 16852803.2, dated May 23, 2019, 10 pages.

Rohde & Schwarz, "Protecting the Sky: Signal Monitoring of Radio Controlled Civilian Unmanned Aerial Vehicle and Possible Countermeasures," Whitepaper, Mar. 4, 2015, 14 pages, XP055453794.

International Search Report and Written Opinion in International Application No. PCT/US2016/55064, dated Dec. 27, 2016, 12 pages.

PCT International Search Report and Written Opinion in International Application. No. PCT/US2018/067348, dated Apr. 8, 2019, 19 pages.

EP Office Action in European Application No. 16852803.2, dated Mar. 29, 2021, 6 pages.

PCT International Preliminary Report on Patentability in International Application No. PCT/US2018/067348, dated Jun. 23, 2020, 9 pages.

* cited by examiner

200

```
┌─────────────────────────────────────────────┐
│ OBTAIN SENSOR DATA FROM ONE OR MORE DRONE   │
│ DETECTING SENSORS LOCATED AT A PROPERTY  210│
└─────────────────────────────────────────────┘
                      │
                      ▼
┌─────────────────────────────────────────────┐
│ DETECT THE PRESENCE OF A DRONE              │
│                                          220│
└─────────────────────────────────────────────┘
                      │
                      ▼
┌─────────────────────────────────────────────┐
│ DETERMINE THAT THE DETECTED                 │
│ DRONE IS AN UNAUTHORIZED DRONE           230│
└─────────────────────────────────────────────┘
                      │
                      ▼
┌─────────────────────────────────────────────┐
│ DETERMINE THAT THE UNAUTHORIZED DRONE IS    │
│ COMMUNICATING, OR ATTEMPTING TO COMMUNICATE,│
│ WITH A NETWORK ASSOCIATED WITH THE PROPERTY │
│                                          240│
└─────────────────────────────────────────────┘
                      │
                      ▼
┌─────────────────────────────────────────────┐
│ SELECT ONE OR MORE NETWORK ADJUSTMENT       │
│ POLICIES                                 250│
└─────────────────────────────────────────────┘
                      │
                      ▼
┌─────────────────────────────────────────────┐
│ TRANSMIT ONE OR MORE INSTRUCTIONS TO ONE OR │
│ MORE NETWORK COMPONENTS OR ONE OR MORE      │
│ MONITORING COMPONENTS TO ADJUST NETWORK     │
│ PARAMTERS BASED ON THE NETWORK ADJUSTMENT   │
│ POLICIES                                 260│
└─────────────────────────────────────────────┘
```

FIG. 2

MONITORING SYSTEM FOR SECURING NETWORKS FROM HACKER DRONES

CROSS-REFERENCE TO RELATED APPLICATION

This application claims the benefit of the U.S. Provisional Patent Application No. 62/609,329 filed Dec. 21, 2017 and entitled "Monitoring System For Securing Networks From Hacker Drones," which is incorporated herein by reference in its entirety.

BACKGROUND

Hacking drone devices have the potential to pose public safety and privacy concerns.

SUMMARY

This disclosure relates to a monitoring system that can detect a hacking drone and secure one or more networks associated with a property based on the detection of a hacking drone within a vicinity of a property.

According to one innovative aspect of the present disclosure, a monitoring system for monitoring a property is disclosed. The monitoring system may include one or more processors and one or more storage devices, the one or more storage devices storing instructions that, when executed by the one or more processors, cause the one or more processors to perform operations. The operations may include obtaining, by the monitoring system, sensor data from one or more sensors located at a property, detecting, by the monitoring system and based on the obtained sensor data, the presence of a drone, determining, by the monitoring system and based on the obtained sensor data, that the detected drone is an unauthorized drone, determining, by the monitoring system, that the unauthorized drone (i) is communicating or (ii) attempting to communicate with a network associated with the property, based on determining, by the monitoring system that the unauthorized drone (i) is communicating or (ii) attempting to communicate with a network associated with the property, selecting, by the monitoring system, one or more network adjustment policies, and transmitting, by the monitoring system, one or more instructions to (i) one or more monitoring system components or (ii) one or more network components that are configured to adjust network parameters based on the one or more selected network adjustment policies.

Other aspects include corresponding methods, apparatus, and computer programs to perform actions of methods defined by instructions encoded on computer storage devices.

These and other versions may optionally include one or more of the following features. For instance, in some implementations, obtaining, by the monitoring system, sensor data from one or more sensors located at the property may include obtaining, by the monitoring system, data generated by the one or more sensors that is (i) indicative of audio signals of one or more drone propellers, (ii) indicative of video signals of nearby airspace depicting at least a portion of a drone, (iii) indicative of image signals of nearby airspace, (iv) indicative of thermal signals generated by a drone, (v) indicative of radar detection of a drone, (vi) indicative of radiofrequency detection of oscillation of electronic circuits of a drone, or (vii) indicative of radiofrequency communications of a drone.

In some implementations, the one or more sensors located at the property are stationary sensors.

In some implementations, the one or more sensors located at the property are mounted to a device that is configured to move over at least a portion of the property.

In some implementations, detecting, by the monitoring system and based on the obtained sensor data, the presence of the drone may include determining, by the monitoring system, that at least a portion of the obtained sensor data satisfies a predetermined similarity threshold when compared to data representing at least one drone attribute.

In some implementations, determining, by the monitoring system and based on the obtained sensor data, that the detected drone is an unauthorized drone may include generating, by the monitoring system, a drone signature based on the obtained sensor data and determining, by the monitoring system and based on the drone signature, that the detected drone is an unauthorized drone.

In some implementations, determining, by the monitoring system, and based on the drone signature, that the detected drone is an unauthorized drone determining, by the monitoring system, whether the drone signature is stored in a database of authorized drone signatures and based on a determination that the drone signature is not stored in the database of authorized drone signatures, determining, by the monitoring system, that the drone represented by the drone signature is an unauthorized drone.

In some implementations, the operations may further include obtaining, by the monitoring system, second sensor data that is generated by the one or more sensors, generating, by the monitoring system, a second drone signature that is based on the second sensor data, determining, by the monitoring system, whether the second drone signature is stored in a database of authorized drone signatures, and based on a determination, by the monitoring system, that the second drone signature is stored in the database of authorized drone signatures, determining, by the monitoring system, that the drone represented by the second drone signature is an authorized drone.

In some implementations, determining, by the monitoring system, that the unauthorized drone (i) is communicating or (ii) attempting to communicate with a network associated with the property may include providing, by the monitoring system, network traffic data associated with a network of the property as an input to a machine learning model that has been trained to detected irregular network activity, wherein the network traffic data includes at least a portion of (i) data received by a device connected to one or more networks associated with the property or (ii) data that is transmitted by a device connected to one or more networks associated with the property, obtaining, by the monitoring system, output data that is generated by the machine learning model that has been trained to detect irregular network activity, wherein the output data is generated as a result of the machine learning model processing the provided network traffic data, and determining, by the monitoring system and based on the obtained output data generated by the machine learning model, whether the unauthorized drone is (i) communicating or (ii) attempting to communicate with the network associated with the property.

In some implementations, determining, by the monitoring system, that the unauthorized drone (i) is communicating or (ii) attempting to communicate with a network associated with the property may include determining, by the monitoring system, that a predetermined pool of data that has been allocated as bait for detection of malicious network activity has been accessed.

In some implementations, the one or more monitoring system components may include (i) one or more monitoring system sensors, (ii) one or more monitoring system cameras, or (iii) a monitoring system control unit.

In some implementations, the one or more network components may include (i) a smartphone, (ii) a tablet, (iii) a laptop, (iv) a desktop computer, (v) a server computer, or (vi) a router.

In some implementations, the network adjustment policies include (i) suspension of all wireless communications by one or more monitoring system components or one or more network components until the one or more monitoring system components or the one or more network components are instructed to be begin wireless communications again, (ii) suspension of all wireless communications by one or more monitoring system components or one or more network components for a predetermined period of time, (iii) suspension of a subset of wireless communications using radio frequencies used by the unauthorized drone by one or more monitoring system components or one or more network components, (iv) limiting wireless communications by one or more monitoring system components or one or more network components to a subset of predetermined communications, (v) requiring one or more monitoring system components or one or more network components to use encrypted communications until the one or more monitoring system components or one or more network components are instructed to use unencrypted wireless communications, or (vi) requiring one or more monitoring system components or one or more network components to use encrypted communications for a predetermined amount of time.

In some implementations, selecting, by the monitoring system, one or more network adjustment policies may include selecting, by the monitoring system, a particular network adjustment policy from among multiple different network adjustment policies based on a plurality of predetermined factors, wherein the plurality of predetermined factors include (i) a type of communication used by the monitoring system, (ii) a type of cameras used by the monitoring system, (iii) state of the monitoring system, (iv) a number of alarm events detected, (v) a number of unauthorized drones that have communicated with or attempted to communicate with the network associated with the property, (vi) a severity of a detected hacking event, (vii) a value of one or more devices connected to the network associated with the property, or (viii) a value of data stored on one or more devices connected to the network that is associated with the property.

In some implementations, the monitoring system may include one or more contact sensors that use wired communication. In such implementations, selecting, by the monitoring system, one or more network adjustment policies may include selecting, by the monitoring system, a network adjustment policy that suspends wireless communication by one or more other monitoring system components or one or more network components until (i) a predetermined amount of time has expired or (ii) the one or more other monitoring system components or the one or more network components receive an instruction to begin using wireless communication again.

In some implementations, the monitoring system may include one or more motion sensors that use wired communication. In such implementations, selecting, by the monitoring system, one or more network adjustment policies may include selecting, by the monitoring system, a network adjustment policy that suspends wireless communication by one or more other monitoring system components or one or more network components until (i) a predetermined amount of time has expired or (ii) the one or more other monitoring system components or the one or more network components receive an instruction to begin using wireless communication again.

In some implementations, the monitoring system may include one or more contact sensors that use wired communication or one or more motion sensors that use wired communication. In such implementations, selecting, by the monitoring system, one or more network adjustment policies may include selecting, by the monitoring system, a network adjustment policy that suspends wireless communications by monitoring system components or network components located at the property. In such implementations transmitting, by the monitoring system, one or more instructions to (i) one or more monitoring system components or (ii) one or more network components that are configured to adjust network parameters based on the one or more selected network adjustment policies may include transmitting, by the monitoring system, an instruction to a network router to suspend access to one or more wireless networks, generated by the network router, by the monitoring system components or the network components located at the property.

In some implementations, the monitoring system may include one or more contact sensors that use wireless communication. In such implementations, selecting, by the monitoring system, one or more network adjustment policies may include selecting, by the monitoring system, a network adjustment policy that requires the one or more motion sensors to use encrypted wireless communications.

In some implementations, the monitoring system may include one or more motion sensors that use wireless communication. In such implementations, selecting, by the monitoring system, one or more network adjustment policies may include selecting, by the monitoring system, a network adjustment policy that requires the one or more motion sensors to use encrypted wireless communications.

DESCRIPTION OF DRAWINGS

FIG. 2 is a flowchart of a process for using a monitoring system to detect a hacking drone and secure a network in response to the detection of the hacking drone.

DETAILED DESCRIPTION

Figure 1:
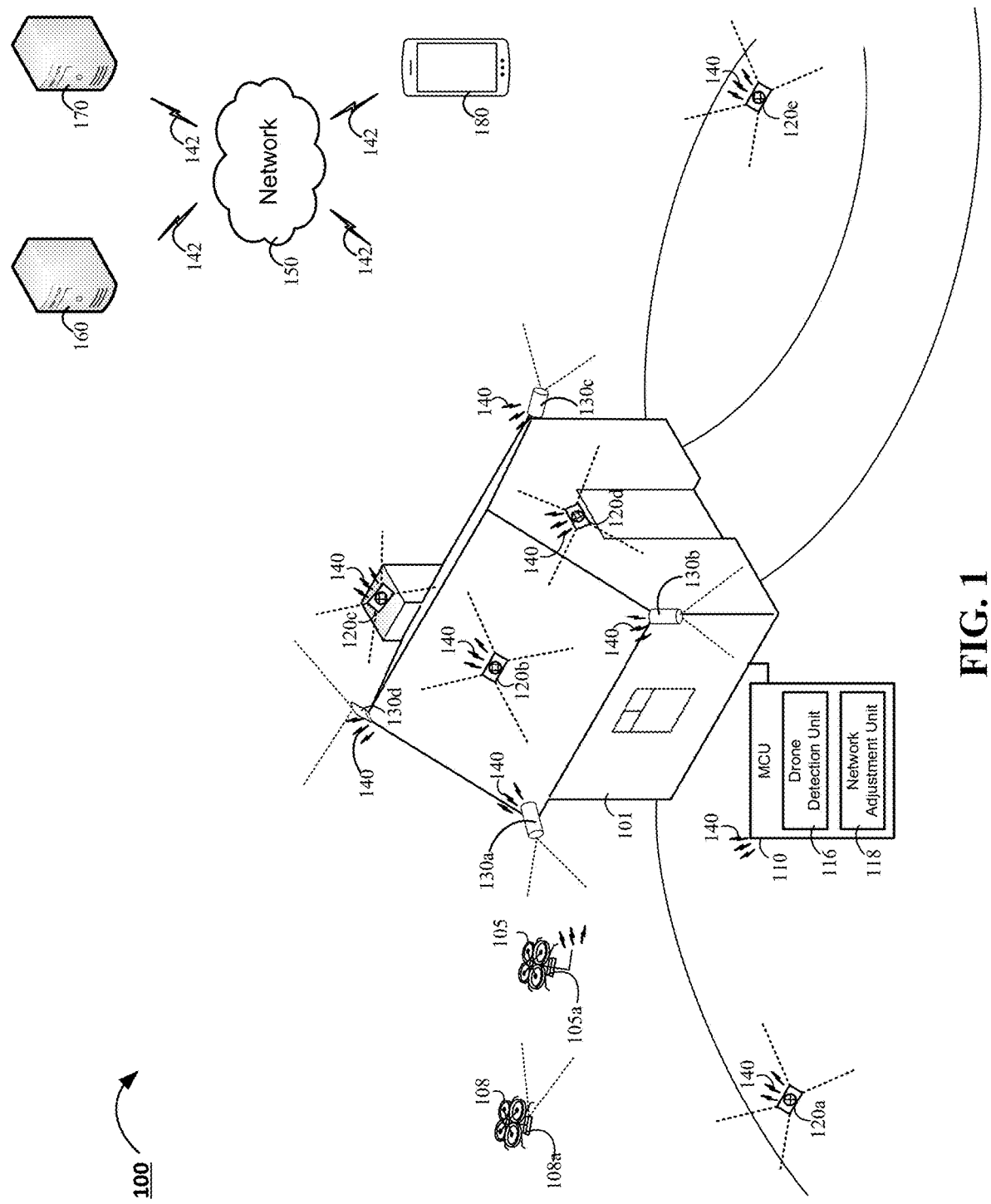
FIG. 1 is a contextual diagram of an example of a monitoring system that can detect a hacking drone and secure a network in response to the detection of the hacking drone.

A monitoring system is disclosed that detects a hacker drone based on sensor data from drone detecting sensors located at a property and performs one or more operations to mitigate the monitoring system's vulnerability to an attack from the hacker drone. The monitoring system may mitigate the monitoring system's vulnerability by initiating one or more operations to secure the one or more networks associated with the property. In some implementations, the one or more networks may be networks used by monitoring system components to communicate.

In one aspect, a monitoring system is disclosed for securing a network based on the detection of a hacking drone. In some implementations, one or more drone detecting sensors may be used to detect the presence of a hacking drone device at or near a property. For example, a drone detecting sensor may sense one or more signals of a hacking drone and generate sensor data that describes the sensed characteristic. A monitoring unit of the monitoring system may detect the generated sensor data and analyze the sensor data. The monitoring unit can then infer the likely presence of the hacking drone based on the analysis of the sensor data. A drone may include any kind of robotic device including quad-copter flying drone, other flying drones, a land-based drone that drives on land, a water-based drone that navigates on water, or the like.

Alternatively, or in addition, in some implementations, the detection of the hacking drone may be based on the detection, by a monitoring unit of the monitoring system, of irregular network communications that may be indicative of a network hacking attempt. In response to the detection of a hacking drone, the monitoring system may perform one or more operations to secure a network used by monitoring system components, a network used by other user devices (e.g., smartphones) associated with an occupant of the property, or both networks. One or more operations that may be performed by the monitoring system to secure the network may include, for example, suspending wireless communications, establishing limits on wireless communications traffic, employing encryption, employing elevated encryption, suspending dual path communications, requiring verification of user issued commands, or the like.

Irregular network communications may include any network communications detected by the monitoring system that are not originating from a network component that is authorized to communicate with the monitoring system. A network component that is authorized to communicate with the monitoring system may include a monitoring system component (e.g., a motion sensor, a drone detecting sensor, a monitoring application server, a monitoring system control unit, a drone, a router, router software, or the like) or a component that is external to the monitoring system. A component that is external to the monitoring system may include, for example, a user device (e.g., a smartphone).

In some implementations, a hacking drone may include an robotic device such as quadcopter drone, a land roving drone, a drone that travels on (or under) water, or the like. Alternatively, in some implementations, the hacking drone may include a user device such as smartphone, a smartwatch, a tablet computer, a desktop computer, or the like.

In some implementations, the hacking drone may be unmanned. For example, the hacking drone may include a semi-autonomous drone or a fully autonomous drone. Alternatively, for example, the hacking drone may be an unmanned hacking drone that may be controlled by a person (e.g., a hacker) using a user device to communicate with the unmanned hacking drone via one or more networks. In other implementations, the hacking drone may be manned drone or manned device that has a person (e.g., a hacker) at the controls such as a vehicle that the person may sit in or a person using a device such as a laptop.

FIG. 1 is a contextual diagram of an example of a monitoring system 100 that can detect a hacking drone 105 and secure a network 140 in response to the detection of the hacking drone 105. The monitoring system 100 may include one or more monitoring system components. Monitoring system components may include, for example, a monitor system control unit 110, one or more drone detecting sensors 120a, 120b, 120c, 120d, 120e, one or more network connected cameras 130a, 130b, 130c, 130d, one or more local networks 140, one or more communications links 142, one or more remote networks 150, one or more monitoring application servers 160, one or more central alarm station servers 170, one or more client devices 180, one or more authorized drones 108, or any combination thereof.

The monitoring system control unit 110 may include a drone detection unit 116 and a network adjustment unit 118. The drone detection unit 116 may be configured to detect the presence of a drone 105 that traveled within a predetermined distance of the property 101 and determine whether the drone 105 is a hacker drone. A hacker drone may include, for example, an unauthorized drone that is communicating, or attempting to communicate with, the network 140. To detect a hacker drone, the monitoring system control unit 110 may determine (i) whether a drone 105 is an authorized drone and (ii) whether the drone 105 is communicating, or attempting to communicate with, the network 140. Communication with a network may include, for example, a communication that has been initiated by the hacker drone, received by one or more network components or one or more monitoring system components, and allowed the hacker drone to access a data stored by the one or more network components or one or more monitoring system components. An attempt to communicate with the network may include communications initiated by the hacker drone towards the network that do not result in the hacker drone accessing data stored by the one or more network components or the one or more monitoring system components The drone detection unit 116 can detect the presence of a drone within a predetermined distance of the property 101 based on an analysis of sensor data generated by one or more drone detecting sensors 120a, 120b, 120c, 120d, 120e. Each respective drone detecting sensor 120a, 120b, 120c, 120d, 120e can sense one or more signals associated with a predetermined geographic area of the property 101 where the drone detecting sensor is located. For example, each respective drone detecting sensor 120a, 120b, 120c, 120d, 120e can be used to monitor a predetermined geographic area associated with the property 101 and detect one or more signals from a drone 105 that is within range of the respective drone detecting sensor. The drone signals that can be detected by a drone detecting sensor may include, for example, audio signals from drone device propellers, video signals of nearby airspace, image signals of nearby airspace, thermal signals generated from the drone device, radar detection of aerial speed of the drone device, radiofrequency detection of oscillation in electronic circuits of the drone device, RF communications frequencies, or the like.

The drone detecting sensors may include stationary drone detecting sensors such as drone detecting sensors 120a, 120b, 120c, 120d, 120e that are affixed to one or more portions of the property 101 or affixed to a feature of the geographic area surrounding the property 101. For example, a particular drone detecting sensor may be attached to the roof of the property 101. Alternatively, or in addition, for example, a particular drone detecting sensor may be attached to a tree near the property 101. Such drone detecting sensors may be used to monitor a particular portion of the geographic area surrounding the property 101 above the roof of the property 101. Similarly, a drone detecting sensor 120d may be affixed above the front door of the property 101 which may be used to monitor for drones in the vicinity of the front door of the property 101. Alternatively, or in addition, one or more drone detecting sensors 120a, 120e may be affixed to features of the geographic area surrounding the property 101 along a border of the property 101. For instance, a drone detecting sensor 120a may be positioned at the west entrance to the property 101 and a drone detecting sensor 120e may be positioned at the east entrance to the property 101. Such drone detecting sensors 120a, 120e may be used to detect the presence of a drone as soon as the drone crosses within a predetermined geographic area of the property 101.

Alternatively, or in addition, the monitoring system 100 may use one or more drone detecting sensors such as a drone detecting sensor 108a that has been mounted to an authorized drone such as an authorized drone 108 to monitor the predetermined geographic area surrounding the property 101. Equipping an authorized drone 108 with a drone detecting sensor 108a provides the advantage of a mobile drone detecting sensors that can be used to monitor multiple different areas of a property. Such an equipped drone 108 may have a dynamic range of surveillance that provides flexibility in monitoring the predetermined geographic area surrounding the property 110. Moreover, in some implementations, the authorized drone device 108 may be configured to pursue and/or engage another drone 105 that is determined to be unauthorized.

With reference to FIG. 1, hacker drone 105 may approach the property 101. As the hacker drone 105 approaches the property 101, drone detecting sensors 120a, 120b may generate drone detecting sensor data based on signals detected from the drone 105. The drone detection unit 116 may obtain (e.g., detect) the generated sensor data and generate a drone signature for the unidentified drone device 130. In this example, the drone detection unit 116 may include one or more software units being stored and executed by the local monitoring system control unit 110. Alternatively, in other implementations, the drone detection unit 116 may be software that is stored and executed by a remote monitoring unit such as a monitoring application server 160. In such implementations, the broadcast sensor data may be detected by (or otherwise transmitted to) a monitoring application server 160 that is remote from the property 101 and the remote monitoring applications server 160 may generate a signature for the unidentified drone device 130. Generally, the monitoring application server 160 can be configure to be a cloud-based monitoring unit that is capable of remotely performing each of the operations (or a subset thereof) discussed herein as being performed by the local monitoring unit 110.

The drone detection unit 116 may use the drone signature to determine whether the drone 105 is an unauthorized drone. For example, the drone detection unit 116 may search a database of authorized drone signatures using the generated drone signature in order to determine if the generated drone signature is included in the database of authorized drone signatures. If the generated drone signature is found in the authorized drone signature database, then the drone is an authorized drone. Alternatively, if the generated drone signature is not found in the authorized drone signature database, then the drone is an unauthorized drone. The drone signature database maybe located locally on a storage device of the monitoring system control unit 110. Alternatively, the drone signature database may be located remotely from the monitoring system control unit 110. In some implementations, the drone signature database may even be maintained on a server that is remote from the property 101 such as the monitoring application server 160. When the drone signature database is remote from the monitoring system control unit 110, the monitoring system control unit 110 may access the remote drone signature database using one or more networks such as the local network 140, one or more remote networks 150, or a combination thereof.

In the example of FIG. 1, the drone detection unit 116 may obtain (e.g., detect) sensor data from one or more drone detecting sensors based on the presence of an authorized drone such as drone 108. The drone detection unit 116 can generate drone signature representative of the signals sensed with respect to the authorized drone 108. The drone detection unit 116 may then perform a search of a drone signature database and determine that a match, within a predetermined threshold amount of error, of the generated signature based on authorized drone 108 is found in the drone signature database. In response to determining that the signature generated by the drone detection unit 116 for the drone 108 is included in the drone signature database, the monitoring system control unit 110 may take no further action and cease any tracking of the drone 108 associated with the drone signature generated by the drone detection unit 116.

Similarly, with further reference to FIG. 1, the drone detection unit 116 may generate a drone signature for the drone 105 based on the detected sensor data that was generated and broadcast by drone detecting sensors 120a, 120b. The drone detection unit 116 may perform a search of a drone signature database and determine that there are no drone signatures in the drone signature database that match the drone signature for the drone 105 within a predetermined threshold amount of error. Accordingly, in this example, the drone detection unit 116 may determine that drone 105 is an unauthorized drone.

In some implementations, responsive to determining that the drone 105 is an unauthorized drone, the drone detection unit 116 may generate and transmit one or more instructions to the network adjustment unit 118 that instruct the network adjustment unit 118 to initiate one or more operations to secure the network 140 based on the detection of the unauthorized drone 105. The one or more operations that may be initiated by the monitoring system control unit 110 to secure the network 140 may include, for example, suspending wireless communications using the network 140, establishing limits on wireless communications traffic across network 140, employing first-level encryption for communications sent and received via network 140, employing elevated encryption (relative to the first-level encryption) for communications sent and received via network 140, suspending dual path communications wherein one of the dual paths is wireless communication via network 140, requiring verification of user issued commands for any commands received via network 140, or the like.

Alternatively, the drone detection unit 116 may delay instructing the network adjustment unit 118 to initiate performance of one or more operations to secure the network 140 until the drone detection unit 116 determines whether the unauthorized drone 105 is a hacker drone. The drone detection unit 116 may determine whether the drone 105 is hacker drone by analyzing the radio frequency (RF) signals output by a radio transmitter 105a of the drone 105. Analyzing the RF signals output by the drone's 105 radio transmitter 105a may include determining whether the drone 105 is communicating with, or is attempting to communicate with, the network 140. Alternatively, or in addition, in some implementations, the drone detection unit 116 may employ one or more artificial intelligence models (e.g., neural networks) to analyze features of network communication data transfers in order to determine if the communications associated with such data transfers are associated with a hack attempt by one or more malicious parties such as a hacking drone 105. Such artificial intelligence models, also referred to as machine learning models, can be trained to detect irregular network activity. For example, the machine learning model may be trained to detect irregular network activity initiated by a potentially malicious device. Such irregular network activity may be detected by detecting data originating from a "foreign device," detecting data originating from a "foreign location," detecting data having "foreign headers" or other identifying data, or the like. The use of the word "foreign" in this context refers to data originating from devices, locations, or of data type that are not routinely associated with the network associated with the property. This may include network traffic originated from a new, or different, device. Alternatively, or in addition, this may include network traffic from new, or different location. Alternatively, or in addition, this may include network traffic having new, or different, header types. In response to determining, based on the analysis of the RF signals output by the drone's 105 radio transmitter 105a or other network communication data, that the drone 105 is a hacker drone, the drone detection unit 116 may instruct the network adjustment unit 118 to initiate performance of one or more operations to secure the network 140.

In some implementations, the drone detection unit's 116 analysis of drone communications and features of network data may be indirect. For example, the drone detection unit 116 may analyze sensor data, reports, or the like generated by one or more other monitoring system components, network components (e.g., routers), or the like that provides an indication as to drone communications with the network 140, drone attempts to communicate with the network 150, and/or features of network traffic on network 140. Such indirect analysis may not require all network communications and network traffic to be routed through or directly monitoring by the drone detection unit 116 (or other components of the monitoring system control unit 110). Alternatively, however, in other implementations, the drone detection unit 116 may directly monitoring such network communications.

As described above, the one or more operations that may be initiated to secure the network 140 may include, for example, suspending wireless communications using the network 140, establishing limits on wireless communications traffic across network 140, employing first-level encryption for communications sent and received via network 140, employing elevated encryption (relative to the first-level encryption) for communications sent and received via network 140, suspending dual path communications wherein one of the dual paths is wireless communication via network 140, requiring verification of user issued commands for any commands received via network 140, or the like.

Though this example describes a scenario where the drone detection unit 116 first determines that a drone 105 is unauthorized and then determines whether the drone is communicating with the network 140, the present disclosure need not be so limited. Instead, for example, the drone detection unit 116 may first determine whether a drone 105 is communicating, or attempting to communicate with, the network 140 (or one or more components thereof), and then to determine whether the drone 105 is authorized (or unauthorized).

In some implementations, the monitoring system may perform other operations such as using a "honeypot" to detect a hacking drone such as drone 105. The use of a "honeypot" to detect a hacking drone such as drone 105 includes exposing data so that is accessible to a device within range of the wireless network portion of network 140. The "honeypot" may include data that is manipulated to appear valuable such as password information, financial information, cryptocurrency tokens, digital wallet passphrases, or the like. This "honeypot" data may include any data that is configured to (i) appear valuable and be part of the network 140, (ii) appear valuable and be stored on a device accessible via the network 140, or the like. However, the "honeypot" data is instead a pool of data that is a monitored data storage environment that is configured to detect potential intrusions. Accordingly, the monitoring system 100 can determine that any hacking drone such as drone 105 that accesses the "honeypot" is a hacking drone without generation of a drone signature, search of a drone signature database, or detection of any other irregular network communications.

The network adjustment unit 118 can initiate performance one or more operations in order to secure the network 140. In some implementations, the network adjustment unit 118 may select a particular set of one or more operations from a pool of available operations in an effort to mitigate the risk to network 140 posed by the hacker drone 105. The selection of the particular set of one or more operations may be based on a plurality of factors that enable the network adjustment unit 118 to initiate a measured response to the hacker drone 105 that secures the network 140 and maintains necessary security monitoring of the property 101. The factors may include, for example, the type of indoor monitoring sensors (e.g., wired or wireless) installed at the property 101, the type of cameras installed at the property (e.g., WiFi cameras, power over Ethernet (POE) cameras), the state of the monitoring system (e.g., armed-away (e.g., motion sensors on), armed-stay (e.g., motion sensors off)), the number of alarm events detected (e.g., motion detected while armed-away, door opened when armed-away or armed-stay, window opened when armed-away or armed-stay), the number of hacker drones detected, the severity of the hack attempt detected (e.g., amount of data transferred (e.g., in MB, GB, TB, or the like), the type of data transferred), the value of devices connected to the wireless network 140, or the like.

For example, in some implementations, the network adjustment unit 118 may transmit one or more instructions to a network component (e.g., a router) of the network 140 that instructs the network component to temporarily suspend all wireless communications in response to detection of an unauthorized drone, a hacker drone, or the like. The network adjustment unit 118 may select such an operation based on a determination that one or more monitoring system 100 components are monitoring system components that can surveil and monitor the property 101 without using a wireless component of the network 140 such as a WiFi network, a Bluetooth network, a Z-Wave network, a ZigBee network, or the like. Such monitoring system components that can surveil the property 101 without using a wireless network may include, for example, one or more hard-wired motion sensors, one or more hard-wired contact sensors, one or more hard-wired cameras (e.g., POE cameras), or a combination thereof. Temporarily suspending wireless communications using the network 140 may serve to deny a detected hacker drone 105 access to the network 140 while still using hardwired components of the monitoring system 100 to continue to monitoring the property 101.

Temporarily suspending wireless communications may include suspending wireless communications across the network 140 for a predetermined period of time. The temporary suspension of wireless communications may include (i) a temporary suspension of all wireless communications 140 or (ii) a temporary suspension of only one or more subsets of a wireless communications network 140 (e.g., (i) only a temporary suspension of WiFi, (ii) only a temporary suspension of Z-Wave, (iii) a temporary suspension of WiFi and Z-Wave but not ZigBee, or the like). In some implementations, the network adjustment unit 118 may also instruct any device having the capability to communicate wired or wirelessly to only communicate via wired networks for the predetermined period of time.

By way of another example, the network adjustment unit 118 can instructing monitoring system components, other network devices (e.g., smartphones), or both, to limit wireless communications exchanged using the network 140 in response to the detection of an unauthorized drone, a hacker drone, or the like. Such operations may reduce RF traffic using the wireless portions of network 140 and thereby reduce the number of signals that a hacker drone can intercept. The wireless communications may be limited based on type (e.g., urgent security alerts only, sensors generating data indicative of a potential alarm event, emergency messages, or the like) or by size (e.g., only allow no more than 50 MB of data transfer per minute)

By way of another example, the network adjustment unit 118 can instruct monitoring system components, other network devices (e.g., smartphones), or both, to encrypt communications exchanged using the network 140 in response to the detection of an unauthorized drone, a hacker drone, or the like. Alternatively, if communications exchanged using the network 140 are already encrypted, the network adjustment unit 118 may instruct monitoring system components, other network devices (e.g., smartphones), or both, communicating using the network 140 to increase their level of encryption based on the detection of the hacker drone.

In some implementations, if the severity of the hacker drone 105 attack exceeds a predetermined threshold, the network adjustment unit 118 may generate and transmit one or more instructions to one or more network components (e.g., a router), one or more monitoring system components (e.g., one or more indoor sensors, one or more cameras, or the like), or both, that instruct the network components, the monitoring system components, or both, to only communicate using encrypted messages. The severity of the hacker drone 105 attack may be based on one or more factors such as the number of hacker drones detected, the severity of the hack attempt detected (e.g., amount of data transferred (e.g., in MB, GB, TB, or the like), the type of data transferred), the value of devices connected to the wireless network, or the like.

Use of encryption, particularly increased (or elevated) encryption, may result in a drop in network performance. However, during a hacking attack by a hacker drone 105, the network adjustment unit 118 may instruct one or more network components (e.g., a router) to suspend communication by one or more non-essential monitoring system components in an effort to converse available bandwidth for use by essential monitoring system components communicating using encrypted messages, elevated encryption, or the like. Essential monitoring system components may include, for example, the monitoring system control unit 110, one or more drone detecting sensors 120*a*, 120*b*, 120*c*, 120*d*, 120*e*, one or more cameras, 130*a*, 130*b*, 130*c*, 130*d*, one or more indoor motions sensors, one or more indoor contract sensors, one or more indoor glass break sensors, or the like.

By way of another example, the network adjustment unit 118 can suspend use of duel-path communication using the network 140 in response to the detection of an unauthorized drone, a hacker drone, or the like. In addition to securing the monitoring system from being accessed by the hacker drone 105, this also functions to reduce the amount of network traffic. Reduction in network traffic enables the monitoring system 100 to more readily respond to a hacking attempt by the hacker drone 105.

By way of another example, the network adjustment unit 118 can instruct one or more components of the network components (e.g., a router), one or more monitoring system components (e.g., one or more indoor sensors, one or more cameras, or the like), or both, to verify that any received wireless commands are from an authorized user, an authorized user device, or both. By way of example, at a point in time after the hacker drone 105 is detected by the drone detection unit 116, a monitoring system control unit 110 may receive an instruction to unlock a connected lock installed at the property 101. In such a scenario, the monitoring system control unit 110 may generate and transmit a request that prompts the requesting device to provide authentication information (e.g., username and password, a pin code, or the like) to verify the identity of the user, the device, or both. The monitoring system control unit 110 can receive the authentication information and authenticate the user, the device, or both, before instructing the connected lock to unlock responsive to the unlock command.

In some implementations, it may not be necessary for the unlock requests and prompts to go through the monitoring system control unit 110. Instead, the unlock command may be sent directly to the connected lock, the prompt for authentication may be generated and transmitted back to the requesting device by the connected lock, and the connected lock may be configured to authenticate the user, the device, or both, based on the received authentication. Other monitoring system components may be used in the same manner, with or without the monitoring system control unit 110 as an intermediary, in order to verify the identity of a requesting user or device when the network 140 is under an attack by a hacking drone.

The drone detection unit 116 may continue to monitor the geographic area surrounding the property 101. Once the drone detection unit 116 no longer detects any unauthorized drones, the drone detection unit 116 may generate and transmit one or more instructions to the network adjustment unit 118 that instruct the network adjustment unit 118 to remove one or more of the security measures employed by the network adjustment unit 118. Removing one or more security measure employed by the network adjustment unit 118 may include, for example, the network adjustment unit 118 instructing one or more monitoring system components, one or more other network devices (e.g., smartphones), or both, to revert back to the network parameter settings that the monitoring system components, the one or more other network devices, or both, were using prior to the detected hack attempt by the hacking drone.

In one or more of the embodiments identified above, the detection of an unauthorized drone, a hacker drone, or both, by the monitoring system control unit 110, the monitoring application server 160, or both, may result in an alarm event being triggered at the property 101 and notification being generated and transmitted to the central alarm station server 170. The central alarm station server 170 may determine whether or not law enforcement agents need to be deployed to the property 101 based on the detection of the hacker drone 105.

FIG. 2 is a flowchart of a process 200 for using a monitoring system to detect a hacking drone and secure a network in response to the detection of the hacking drone. Generally, the process 200 may include obtaining sensor data from one or more drone detecting sensors located at a property (210), detecting the presence of a drone (220), determining that the drone is an unauthorized drone (230), determining that the unauthorized drone is communicating, or attempting to communicate, with a network associated with the property (240), selecting one or more network adjustment policies (250), and transmitting one or more instructions to one or more network components, one or more monitoring system components, or both, to adjust network parameters based on the selected network adjustment policies (260). For convenience, the process 200 will be described as being performed by a monitoring unit such as the monitoring system control unit 110 or the monitoring application server 160 of FIG. 1.

In more detail, a monitoring unit may obtain 210 sensor data from one or more drone detecting sensors located at a property. For example, the monitoring unit can obtain sensor data data generated by the one or more drone detecting sensors that is (i) indicative of audio signals of one or more drone propellers, (ii) indicative of video signals of nearby airspace depicting at least a portion of a drone, (iii) indicative of image signals of nearby airspace, (iv) indicative of thermal signals generated by a drone, (v) indicative of radar detection of a drone, (vi) indicative of radiofrequency detection of oscillation of electronic circuits of a drone, or (vii) indicative of radiofrequency communications of a drone.

The monitoring unit can detect 220 the presence of a drone based on the obtained sensor data. In some implementations, the monitoring unit can detect the presence of a drone by comparing the obtained sensor data to stored data representing one or more attributes of a drone. The attributes of the drone may include, for example, data representing audio signals of one or more drone propellers, (ii) data representing video signals of nearby airspace depicting at least a portion of a drone, (iii) data representing image signals of nearby airspace, (iv) data representing thermal signals generated by a drone, (v) data representing radar detection of a drone, (vi) data representing radiofrequency detection of oscillation of electronic circuits of a drone, or (vii) data representing radiofrequency communications of a drone. In some implementations, the data representing one or more attributes of the drone may include a drone signature that is generated to collectively represent multiple drone attributes. In other implementations, the stored data representing the drone may represent only a single drone attribute. Such data representations may function as a fingerprint that can be used to uniquely identify a drone that triggered the generation of the sensor data upon which the drone signature is based.

The monitoring unit can determine 230 that the drone is an unauthorized drone using the obtained sensor data. For example, the monitoring unit can perform a search of an authorized drone database based on obtained sensor data. If an entry storing data representing one or more drone attributes is found in the authorized drone database that matches data representing the obtained sensor data within a predetermined similarity threshold, then the monitoring unit can ignore the presence of the drone represented by the obtained sensor data because the drone is an authorized drone. Alternatively, if an entry storing data representing one or more drone attributes is not found in the authorized drone database that matches data representing the obtained sensor data within a predetermined similarity threshold, then the monitoring unit can determine that the drone represented by the obtained sensor data is an unauthorized drone.

In some implementations, the monitoring unit generates a drone signature, based on the obtained sensor data, that collectively represents multiple drone attributes. In such implementations, the monitoring unit can use the generated drone signature to search the authorized drone database to determine if the authorized drone database includes a drone signature for an authorized drone that matches the generated drone signature within a predetermined similarity threshold. In other implementations, the monitoring unit may perform a search of the authorized drone database using data representing a single drone attribute. In such implementations, the monitoring unit can determine if the authorized drone database includes data representing any authorized drone feature that matches the data representing the single drone attribute within a predetermined similarity threshold. Both the drone signature and the data representing the single drone attribute may be based on the obtained sensor data.

The monitoring unit can determine 240 that the unauthorized drone is communicating, or attempting to communicate, with a network associated with the property. For example, the monitoring unit can determine whether the unauthorized drone is communicating, or attempting to communicate, with the network by analyzing the radio frequency (RF) signals output by a radio transmitter of the drone. Alternatively, or in addition, in some implementations, the monitoring unit may employ one or more artificial intelligence models (e.g., neural networks) to analyze features of network communication data transfers in order to determine if the communications associated with such data transfers are associated with a hack attempt by one or more malicious parties such as a hacking drone. The features of the network communication data analyzed by the monitoring unit may be obtained by, and transmitted to, the monitoring unit by one or more drone detecting sensors or one or more other components of the monitoring system.

In response to determining that an unauthorized drone is communicating, or attempting to communicate, with a network associated with the property, the monitoring unit may select 250 one or more network adjustment policies that can be initiated to secure the network. The network adjustment policies may include one or more of suspending wireless communications using the network, establishing limits on wireless communications traffic across the network, employing first-level encryption for communications sent and received via the network, employing elevated encryption (relative to the first-level encryption) for communications sent and received via the network, suspending dual path communications wherein one of the dual paths is wireless communication via the network, requiring verification of user issued commands for any commands received via the network, or the like.

The selection of the one or more network adjustment policies may be based on a variety of factors including the type of indoor monitoring sensors (e.g., wired or wireless) installed at the property 101, the type of cameras installed at the property (e.g., WiFi cameras, power over Ethernet (POE) cameras), the state of the monitoring system (e.g., armed-away (e.g., motion sensors on), armed-stay (e.g., motion sensors off)), the number of alarm events detected (e.g., motion detected while armed-away, door opened when armed-away or armed-stay, window opened when armed-away or armed-stay), the number of hacker drones detected, the severity of the hack attempt detected (e.g., amount of data transferred (e.g., in MB, GB, TB, or the like), the type of data transferred), the value of devices connected to the wireless network, or the like.

The monitoring unit may transmit 260 one or more instructions to one or more network components, monitoring system components, or both, to instruct respective components to adjust one or more network parameters based on the selected one or more network adjustment policies.

The aforementioned process is one example of a process for using the monitoring system to secure a network in response to the detection of a hacking drone. However, the present disclosure need not be limited. For example, the monitoring system can perform the stages of process 200 in a different order. In other instances, the monitoring system may not have to perform all of the stages of process 200 before determining to adjust one or more network parameters.

In some implementations, for example, a monitoring system may first determine whether a drone is communicating, or attempting to communicate, with the network before determining whether the drone is an authorized drone. In other implementations, for example, the monitoring system may automatically instruct one or more network components, monitoring system components, or both, to adjust one or more network parameters based on the detection of an unauthorized drone without first determining if the unauthorized drone is communicating, or attempting to communicate, with the network.

Figure 3:
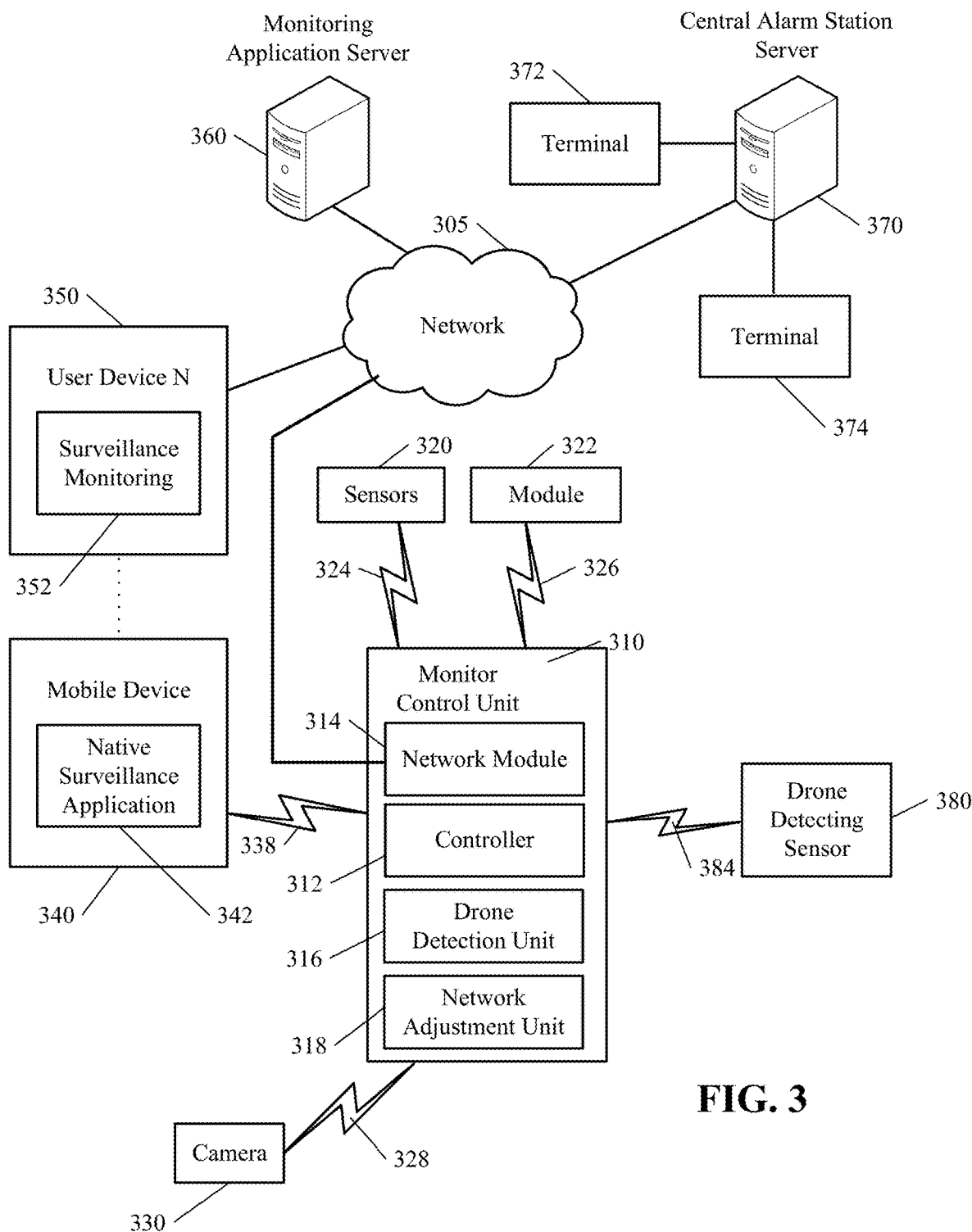
FIG. 3 is a block diagram of an example of a system configured to detect a hacking drone and secure a network in response to the detection of the hacking drone.

FIG. 3 is a block diagram of an example of a system configured to detect a hacking drone and secure a network in response to the detection of the hacking drone. The electronic system 300 includes a network 305, a monitor control unit 310, one or more user devices 340, 350, a monitoring application server 360, a central alarm station server 370, and one or more drone detecting sensors 380. In some examples, the network 305 facilitates communications between the monitoring application server 360, and the central alarm station server 370.

The network 305 is configured to enable exchange of electronic communications between devices connected to the network 305. For example, the network 305 may be configured to enable exchange of electronic communications between the monitoring system control unit 310, the one or more user devices 340, 350, the monitoring application server 160, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The monitoring system control unit 310 includes a controller 312 and a network module 314. The controller 312 is configured to control a monitoring system (e.g., a home alarm or security system) that includes the monitoring system control unit 310. In some examples, the controller 312 may include a processor or other control circuitry configured to execute instructions of a program that controls operation of an alarm system. In these examples, the controller 312 may be configured to receive input from sensors, detectors, or other devices included in the alarm system and control operations of devices included in the alarm system or other household devices (e.g., a thermostat, an appliance, lights, etc.). For example, the controller 312 may be configured to control operation of the network module 314 included in the monitoring system control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the monitoring system control unit 310 to communicate over a local area network and/or the Internet. The network module 314 also may be a voiceband modem configured to enable the alarm panel to communicate over the telephone lines of Plain Old Telephone Systems (POTS).

The monitoring system 310 also includes a drone detection unit 316. The drone detection unit 316 may be configured to detect the presence of a drone that traveled within a predetermined distance of the property and determine whether the drone is a hacker drone. A hacker drone may include, for example, an unauthorized drone that is communicating, or attempting to communicate with, the network 305, communications links 324, 326, 328, 338, 384, or one or more components connected thereto. To detect a hacker drone, the drone detection unit 316 of the monitoring system control unit 310 may determine (i) whether a detected drone is an authorized drone and (ii) whether the detected drone is communicating, or attempting to communicate with, the network 305, communications links 324, 326, 328, 338, 384, or one or more components connected thereto.

The drone detection unit 316 can detect the presence of a drone within a predetermined distance of the property based on an analysis of sensor data generated by one or more drone detecting sensors 384. Each respective drone detecting sensor 380 can sense one or more signals associated with a predetermined geographic area of the property where the drone detecting sensor is located. For example, each respective drone detecting sensor 380 can be used to monitor a predetermined geographic area associated with the property and detect one or more signals from a drone that is within range of the respective sensor. The detected signals may include, for example, audio signals from drone device propellers, video signals of nearby airspace, image signals of nearby airspace, thermal signals generated from the drone device, radar detection of aerial speed of the drone device, radiofrequency detection of oscillation in electronic circuits of the drone device, RF communications frequencies, or the like.

The drone detection unit 316 is configured to generate a drone signature that is a collective representation of one or more drone signals described by sensor data from one or more drone detecting sensors. The drone detection unit 316 may store a database of authorized drone signatures, and the drone detection unit 316 may search the database of authorized drones using the generated drone signature in order to determine if the generated drone signature is included in the database of authorized drone signatures. If the generated drone signature is found in the authorized drone database, then the drone is an authorized drone. Alternatively, if the generated drone signature is not found in the authorized drone database, then the drone is an unauthorized drone. Though the example described here is a scenario where the drone detection unit 316 of the monitoring system control unit 310 stores the authorized drone database, the present disclosure need not be so limited. Instead, in some implementations, the authorized drone database may be stored on a remote server in the cloud such as the monitoring application server 360. In such instances, the drone detection unit 316 may communicate with the remote server via the network 305 one or more communications links in order to perform a search of the authorized drone database.

The drone detection unit 316 may determine, based on a search of the authorized drone database, whether a detected drone is an authorized drone or unauthorized drone. If the drone detection unit 316 detects an unauthorized drone, the drone detection unit 316 may generate and transmit one or more instructions to the network adjustment unit 318 that instruct the network adjustment unit 318 to initiate performance one or more operations to secure the network 305 and one or more communications links 324, 326, 328, 338, 384 based on the detection of the unauthorized drone. The one or more operations that may be performed by the monitoring system to secure the network 305 and one or more communications links 324, 326, 328, 338, 384 may include, for example, suspending wireless communications using the network 305 and one or more communications links 324, 326, 328, 338, 384, establishing limits on wireless communications traffic across the network 305 and one or more communications links 324, 326, 328, 338, 384, employing first-level encryption for communications sent and received via the network 305 and one or more communications links 324, 326, 328, 338, 384, employing elevated encryption (relative to the first-level encryption) for communications sent and received via the network 305 and one or more communications links 324, 326, 328, 338, 384, suspending dual path communications wherein one of the dual paths is wireless communication via the network 305 and one or more communications links 324, 326, 328, 338, 384, requiring verification of user issued commands for any commands received via the network 305 and one or more communications links 324, 326, 328, 338, 384, or the like.

Alternatively, the drone detection unit 316 may delay instructing the network adjustment unit 318 to secure the network 305 and one or more communications links 324, 326, 328, 338, 384 until the drone detection unit 316 determines whether the unauthorized drone is a hacker drone. The drone detection unit 316 may determine whether the unauthorized drone is a hacker drone by analyzing the radio frequency (RF) signals output by a radio transmitter of the unauthorized drone. Analyzing the RF signals output by the drone's radio transmitter may include determining whether the drone is communicating with, or is attempting to communicate with, the network 305 and one or more communications links 324, 326, 328, 338, 384.

In response to determining, based on the analysis of the RF signals output by the drone's radio transmitter, that the drone is a hacker drone, the drone detection unit 316 may instruct the network adjustment unit 318 to initiate performance one or more operations to secure the network 305 and one or more communications links 324, 326, 328, 338, 384. As described above, the one or more operations to secure the network 305 and one or more communications links 324, 326, 328, 338, 384 may include one or more operations such as, for example, suspending wireless communications using the network 305 and one or more communications links 324, 326, 328, 338, 384, establishing limits on wireless communications traffic across the network 305 and one or more communications links 324, 326, 328, 338, 384, employing first-level encryption for communications sent and received via the network 305 and one or more communications links 324, 326, 328, 338, 384, employing elevated encryption (relative to the first-level encryption) for communications sent and received via the network 305 and one or more communications links 324, 326, 328, 338, 384, suspending dual path communications wherein one of the dual paths is wireless communication via the network 305 and one or more communications links 324, 326, 328, 338, 384, requiring verification of user issued commands for any commands received via the network 305 and one or more communications links 324, 326, 328, 338, 384, or the like.

The monitoring system that includes the monitoring system control unit 310 includes one or more sensors or detectors. For example, the monitoring system may include multiple sensors 320. The sensors 320 may include a contact sensor, a motion sensor, a glass break sensor, or any other type of sensor included in an alarm system or security system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The monitoring system control unit 310 communicates with the module 322 and the camera 330 to perform surveillance or monitoring. The module 322 is connected to one or more devices that enable home automation control. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol). Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the monitoring system control unit 310. For instance, the module 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building monitored by the monitoring system control unit 310. The camera 330 may be configured to capture single, static images of the area and also video images of the area in which multiple images of the area are captured at a relatively high frequency (e.g., thirty images per second). The camera 330 may be controlled based on commands received from the monitoring system control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the monitoring control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the monitoring system control unit 310 and the camera 330 receives commands related to operation from the monitoring application server 360.

The system 300 further includes one or more drone detecting sensors 380. The drone detecting sensors 380 may be electronic devices that include sensors to detect the presence of unmanned aerial devices (UADs), such as drone devices. For instance, the sensors may be capable of detecting various types of signals that are generated from the operation of a drone device such as, for example, audio signals from drone device propellers, video signals of nearby airspace, thermal signals generated from the drone devices, radar detection of aerial speed of drone devices, or radiofrequency (RF) detection of oscillation in electronic circuits of drone devices.

The one or more drone detecting sensors 380 may be placed within different locations within a property. For example, in some instances, the one or more drone detecting sensors 380 may be placed near boundaries of the properties such that the one or more drone detecting sensors 380 may detect the presence of an unauthorized drone device at or near the property. In some instances, the one or more drone detecting sensors 380 may be placed in different locations. For example, a first drone device may be placed near a north entrance to detect incoming drone devices from the north side of the property and a second drone detector may be placed near a south entrance to detect incoming drone devices from the south side of property. The one or more drone detecting sensors 380 may be placed in the property (e.g., at a garage, a door, or window of the property) or external to the property (e.g., on a roof, chimney, antennae, etc., or in an external housing located on the ground or on a structure).

In some implementations, the drone detecting sensors 380 may include several hardware components. For example, the drone detecting sensors 380 may include one or more cameras, one or more proximity sensors, one or more microphones, one or more gyroscopes, one or more accelerometers, one or more magnetometers, a global positioning system (GPS) unit, an altimeter, one or more sonar or laser sensors, and/or any other types of sensors that aid in the detection of drone devices at or near the property. The one or more drone detecting sensors 380 may include control processors that process output from the various sensors and control the drone detecting sensors 380 to determine the presence of drone devices at or near the property. In this regard, the control processors detect particular signals that enable the drone detecting sensors to identify a drone device.

In some examples, the one or more drone detecting sensors 380 may include data capture and recording devices. In these examples, the one or more drone detecting sensors 380 may include one or more cameras, one or more motion sensors, one or more microphones, one or more temperature sensors, one or more humidity sensors, one or more air flow sensors, and/or any other types of sensors that may be useful in capturing monitoring data related to the property and users in the property. For instance, the data capture and recording devices may be used to enhance detection signals of a drone device at or near the property. For example, the one or more temperature sensors may indicate heat signatures associated with the drone device, the one or more air flow sensors may indicate changes aerial signals generated by the drone device, and the one or more microphones may be used to detect harmonic patterns that indicate drone device activity. In some instances, the various signals generated by the different data capture and recording devices may be compared to verify the detection of a drone device at or near the property.

The one or more drone detecting sensors 380 also may include a communication module that enables the one or more drone detecting sensors 380 to communicate with the monitoring system control unit 310, each other, and/or other devices. The communication module may be a wireless communication module that allows the one or more drone detecting sensors 380 to communicate wirelessly. For instance, the communication module may be a Wi-Fi module that enables the one or more drone detecting sensors 380 to communicate over a local wireless network at the property. The communication module further may be a 900 MHz wireless communication module that enables the one or more drone detecting sensors 380 to communicate directly with the monitoring system control unit 310. Other types of short-range wireless communication protocols, such as Bluetooth, Bluetooth LE, Zwave, Zigbee, etc., may be used to allow the one or more drone detecting sensors 380 to communicate with other devices in the property.

The one or more drone detecting sensors 380 further may include processor and storage capabilities. The one or more drone detecting sensors 380 may include any suitable processing devices that enable the one or more drone detecting sensors 380 to operate applications and perform the actions described throughout this disclosure. In addition, the one or more drone detecting sensors 380 may include solid state electronic storage that enables the one or more drone detecting sensors 380 to store applications, configuration data, collected sensor data, and/or any other type of information available to the one or more drone detecting sensors 380.

In some implementations, the one or more drone detecting sensors 380 may additionally be used to perform routine surveillance operations on a property. For instance, the one or more drone detecting sensors 380 may be assigned to one or more particular properties within a geographic location and may routinely collect surveillance footage during specified time periods (e.g., after dark), which may then be transmitted to the application server 360 for transmitting back to each particular property owner. In such implementations, the property owner may receive the surveillance footage over the network 305 as a part of a service provided by a security provider that operates the application server 360. For example, transmissions of the surveillance footage collected by the one or more drone detecting sensors 380 may be part of a premium security service package provided by a security provider.

In some implementations, the one or more drone detecting sensors 380 may be drone devices, or placed on drone devices to perform surveillance at or near a property. For example in such implementations, surveillance by the one or more drone detecting sensors 380 may be conducted by particular drone devices that navigate through the property using specific navigation patterns. For instance, initial configuration of the one or more drone detecting sensors 380 may include learning of one or more navigation patterns in which a user provides input to control the one or more drone detecting sensors 380 to perform a specific detection action (e.g., enable a particular detector sensor based on the features of the property). In this regard, the one or more drone detecting sensors 380 may learn and store the navigation patterns such that the one or more drone detecting sensors 380 may automatically repeat the specific navigation actions upon a later request.

In some implementations where the one or more drone detecting sensors 380 may be drone devices, the monitoring system control unit 310 may monitor operational status of the one or more drone detecting sensors 380 and coordinate further operation based on the operational status. In some implementations, the system 300 allows central station operators, first responders, and/or users of the property to interact with and control the one or more drone detecting sensors 380. In some examples, the one or more drone detecting sensors 380 may periodically perform test sequences to ensure the one or more drone detecting sensors 380 will operate correctly if needed. The monitoring system control unit 310 also may arrange the test sequences to occur during periods of time that are convenient for users of the property. For example, the monitoring system control unit 310 may assess sensor data at the property and determine a time period in which the property is unoccupied and unlikely to be occupied until the test sequences complete. In this example, the monitoring system control unit 310 waits until the preferred time period to initiate test sequences for one or more of the one or more drone detecting sensors 380.

The sensors 320, the module 322, the camera 330, and the one or more drone detecting sensors 380 communicate with the controller 312 over communication links 324, 326, 328, and 384, respectively. The communication links 324, 326, 328, and 384 may be a wired or wireless data pathway configured to transmit signals from the sensors 320, the module 322, the camera 330, and the one or more drone detecting sensors 380 to the controller 312. The sensors 320, the module 322, the camera 330, and the one or more drone detecting sensors 380 may continuously transmit sensed values to the controller 312, periodically transmit sensed values to the controller 312, or transmit sensed values to the controller 312 in response to a change in a sensed value.

The communication links 324, 326, 328, and 384 may include a local network. The sensors 320, the module 322, the camera 330, and the one or more drone detecting sensors 180 and the controller 312 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 360 is an electronic device configured to provide monitoring services by exchanging electronic communications with the monitoring system control unit 310, the one or more user devices 340, 350, and the central alarm station server 370 over the network 305. For example, the monitoring application server 360 may be configured to monitor events (e.g., alarm events, detection of drone devices) generated by the monitoring system control unit 310. In this example, the monitoring application server 360 may exchange electronic communications with the network module 314 included in the monitoring system control unit 310 to receive information regarding events (e.g., alarm events) detected by the monitoring system control unit 310. The monitoring application server 360 also may receive information regarding events (e.g., alarm events) from the one or more user devices 340, 350.

In some examples, the monitoring application server 360 may route alarm data received from the network module 314 or the one or more user devices 340, 350 to the central alarm station server 370. For example, the monitoring application server 360 may transmit the alarm data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the monitoring system control unit 310 or the one or more user devices 340, 350.

The central alarm station server 370 is an electronic device configured to provide alarm monitoring service by exchanging communications with the monitoring system control unit 310, the one or more mobile devices 340, 350, and the monitoring application server 360 over the network 305. For example, the central alarm station server 370 may be configured to monitor alarm events generated by the monitoring system control unit 310. In this example, the central alarm station server 370 may exchange communications with the network module 314 included in the monitoring system control unit 310 to receive information regarding alarm events detected by the monitoring system control unit 310. The central alarm station server 370 also may receive information regarding alarm events from the one or more mobile devices 340, 350 and/or the monitoring application server 360.

The central alarm station server 370 is connected to multiple terminals 372 and 374. The terminals 372 and 374 may be used by operators to process alarm events. For example, the central alarm station server 370 may route alarm data to the terminals 372 and 374 to enable an operator to process the alarm data. The terminals 372 and 374 may include general-purpose computers (e.g., desktop personal computers, workstations, or laptop computers) that are configured to receive alarm data from a server in the central alarm station server 370 and render a display of information based on the alarm data. For instance, the controller 312 may control the network module 314 to transmit, to the central alarm station server 370, alarm data indicating that a sensor 320 detected a door opening when the monitoring system was armed. The central alarm station server 370 may receive the alarm data and route the alarm data to the terminal 372 for processing by an operator associated with the terminal 372. The terminal 372 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

In some implementations, the central alarm station server 370 may exchange communications with an emergency service provider to transmit alarm signal data indicating an alarm event taking place within a property where the monitor control unit 310 may be located. For instance, the central alarm station 370 may transmit incident reports in response to the monitor control unit 310 detecting an alarm event where a user requires emergency assistance. In such instances, the central alarm stations server 370 may be an electronic device that communicates essential safety information to an emergency responder such as an emergency medial responder, a fire department, or a public safety access point.

In some implementations, the central alarm station server 370 may be a third party entity separate from the monitoring application server 360. For example, the central alarm station server 370 may be a central alarm station for a security service provider, a campus security server in a school or school/university police department, or security gateway for a particular residential neighborhood. For instance, the central alarm station server 370 may be registered to the system 300 using a connection bridge such as the application (e.g., the native surveillance application 342), using a unique user identifier such as a username and password or a Quick Response (QR). In other instances, the central alarm station server 370 may be registered to users within a particular geographic location (e.g., a gated residential community) where users within the geographical location are registered to a particular central alarm station server 370 and a particular monitoring application server 360 of the particular location.

The one or more user devices 340, 350 are devices that host and display user interfaces. For instance, the user device 340 is a mobile device that hosts one or more native applications (e.g., the native surveillance application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a native surveillance application 342. The native surveillance application 342 refers to a software/firmware program running on the corresponding mobile device that enables the user interface and features described throughout. The user device 340 may load or install the native surveillance application 342 based on data received over a network or data received from local media. The native surveillance application 342 runs on mobile devices platforms, such as iPhone, iPod touch, Blackberry, Google Android, Windows Mobile, etc. The native surveillance application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the monitoring system control unit 310 over the network 305. The user device 350 may be configured to display a surveillance monitoring user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340, 350 communicate with and receive monitoring system data from the monitoring system control unit 310 using the communication link 338. For instance, the one or more user devices 340, 350 may communicate with the monitoring system control unit 310 using various local wireless protocols such as WiFi, Bluetooth, Z-wave, ZigBee, HomePlug (ethernet over powerline), or wired protocols such as Ethernet and USB, to connect the one or more user devices 340, 350 to local security and automation equipment. The one or more user devices 340, 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340, 350 are shown as communicating with the monitoring system control unit 310, the one or more user devices 340, 350 may communicate directly with the sensors and other devices controlled by the monitoring system control unit 310. In some implementations, the one or more user devices 340, 350 replace the monitoring system control unit 310 and perform the functions of the monitoring system control unit 310 for local monitoring and long range/offsite communication.

In other implementations, the one or more user devices 340, 350 receive monitoring system data captured by the monitoring system control unit 310 through the network 305. The one or more user devices 340, 350 may receive the data from the monitoring system control unit 310 through the network 305 or the monitoring application server 360 may relay data received from the monitoring system control unit 310 to the one or more user devices 340, 350 through the network 305. In this regard, the monitoring application server 360 may facilitate communication between the one or more user devices 340, 350 and the monitoring system.

In some implementations, the one or more user devices 340, 350 may be configured to switch whether the one or more user devices 340, 350 communicate with the monitoring system control unit 310 directly (e.g., through link 338) or through the monitoring application server 360 (e.g., through network 305) based on a location of the one or more user devices 340, 350. For instance, when the one or more user devices 340, 350 are located close to the monitoring system control unit 310 and in range to communicate directly with the monitoring system control unit 310, the one or more user devices 340, 350 use direct communication. When the one or more user devices 340, 350 are located far from the monitoring system control unit 310 and not in range to communicate directly with the monitoring system control unit 310, the one or more user devices 340, 350 use communication through the monitoring application server 360.

Although the one or more user devices 340, 350 are shown as being connected to the network 305, in some implementations, the one or more user devices 340, 350 are not connected to the network 305. In these implementations, the one or more user devices 340, 350 communicate directly with one or more of the monitoring system components and no network (e.g., Internet) connection or reliance on remote servers is needed.

In some implementations, the one or more user devices 340, 350 are used in conjunction with only local sensors and/or local devices in a house. In these implementations, the system 100 only includes the one or more user devices 340, 350, the sensors 320, the module 322, the camera 330, and the one or more drone detecting sensors 380. The one or more user devices 340, 350 receive data directly from the sensors 320, the module 322, the camera 330, and the one or more drone detecting sensors 380 and sends data directly to the sensors 320, the module 322, the camera 330, and the one or more drone detecting sensors 380. The one or more user devices 340, 350 provide the appropriate interfaces/processing to provide visual surveillance and reporting.

In other implementations, the system 300 further includes network 305 and the sensors 320, the module 322, the camera 330, and the one or more drone detecting sensors 380 are configured to communicate sensor and image data to the one or more user devices 340, 350 over network 305 (e.g., the Internet, cellular network, etc.). In yet another implementation, the sensors 320, the module 322, the camera 330, and the one or more drone detecting sensors 380 (or a component, such as a bridge/router) are intelligent enough to change the communication pathway from a direct local pathway when the one or more user devices 340, 350 are in close physical proximity to the sensors 320, the module 322, the camera 330, and the one or more drone detecting sensors 380 to a pathway over network 305 when the one or more user devices 340, 350 are farther from the sensors 320, the module 322, the camera 330, and the one or more drone detecting sensors 380. In some examples, the system leverages GPS information from the one or more user devices 340, 350 to determine whether the one or more user devices 340, 350 are close enough to the sensors 320, the module 322, the camera 330, and the one or more drone detecting sensors 380 to use the direct local pathway or whether the one or more user devices 340, 350 are far enough from the sensors 320, the module 322, the camera 330, and the one or more drone detecting sensors 380 that the pathway over network 305 is required. In other examples, the system leverages status communications (e.g., pinging) between the one or more user devices 340, 350 and the sensors 320, the module 322, the camera 330, and the one or more drone detecting sensors 380 to determine whether communication using the direct local pathway is possible. If communication using the direct local pathway is possible, the one or more user devices 340, 350 communicate with the sensors 320, the module 322, the camera 330, and the one or more drone detecting sensors 380 using the direct local pathway. If communication using the direct local pathway is not possible, the one or more user devices 340, 350 communicate with the sensors 320, the module 322, the camera 330, and the one or more drone detecting sensors 380 using the pathway over network 305.

In some implementations, the system 300 provides end users with access to images captured by the camera 330 to aid in decision making. The system 300 may transmit the images captured by the camera 330 over a wireless WAN network to the user devices 340, 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door opening event for a door that leads to an area within a field of view of the camera 330, or motion in the area within the field of view of the camera 330. In other implementations, the camera 330 may capture images continuously, but the captured images may be stored or transmitted over a network when needed.

Further, in some implementations, the system 300 intelligently leverages the one or more drone detecting sensors 380 to aid in security monitoring, property automation, and property management. For example, the one or more drone detecting sensors 380 may aid in investigating alarm events detected at the property by the monitoring system control unit 310. In this example, the monitoring system control unit 310 may detect an alarm event (e.g., a fire alarm, an entry into the property when the system is armed "Stay," etc.) and, based on the detected alarm event, control the one or more drone detecting sensors 380 to attempt to identify drones devices at or near the property at the time of the alarm event. Specifically, the monitoring system control unit 310 may send a control command to each of the one or more drone detecting sensors 380 that causes the one or more drone detecting sensors 380 to perform a coordinated and automated search for drone devices at or near the property. Based on the control command received, each of the one or more drone detecting sensors 380 begins navigating the property and captures images of the property while navigating. Each of the one or more drone detecting sensors 380 may execute a predefined navigation pattern at or near the property or the one or more drone detecting sensors 380 may execute a coordinated scan of the property in which the one or more drone detecting sensors 380 exchange location information and navigate to areas that have not been explored by one of the other devices.

In some examples, the one or more drone detecting sensors 380 may analyze the images captured during the scan of the property for the presence of drone devices in the captured images. For instance, the one or more drone detecting sensors 380 may use image processing techniques in an attempt to identify shapes in the captured images that resemble a drone device. The one or more drone detecting sensors 380 also may analyze the images for moving objects (or use other techniques to identify moving objects) and target imaging on capture of moving objects.

Based on detection of a drone device or another type of moving object, the one or more drone detecting sensors 380 may lock onto the drone device and follow the drone device throughout the property. In this regard, the one or more drone detecting sensors 380 may track the movement of the drone device throughout the property and capture images of the movement. In addition, once one of the one or more drone detecting sensors 380 locks onto a drone device, the one or more drone detecting sensors 380 coordinate to ensure that multiple of the one or more drone detecting sensors 380 do not lock onto the same drone device. The coordination may be direct amongst the one or more drone detecting sensors 380 and/or through the monitoring system control unit 310. The coordination may involve sharing the location of the drone device. Based on the shared location and attributes, the one or more drone detecting sensors 380 may determine whether multiple drone detecting sensors 180 have locked onto the same drone device and take action accordingly.

In some examples, the one or more drone detecting sensors 380 perform image recognition processing on the one or more images in an attempt to detect whether any identified drone devices are legitimate access to the property. In these examples, the one or more 380 may have access to access lists of legitimate drone devices (e.g., drone devices provided as part of a security service) that may enter the property and may compare images being captured to the accessed images of legitimate drone devices. Based on the comparison, the one or more drone detecting sensors 380 may determine whether the imaged drone devices match a legitimate drone device of the property. For example, the drone detecting sensors 380 use electronic signature recognition techniques, based on an identified RF signal, to determine whether the imaged drone devices matches a legitimate drone device of the property. The one or more drone detecting sensors 380 then use the determination of whether the imaged drone device matches a legitimate drone device of the property to control further tracking operations.

For example, based on a determination that the imaged drone device is an unauthorized electronic device, the one or more drone detecting sensors 380 may continue tracking the drone device and ensure that images sufficient to identify the drone device have been captured. In this example, the one or more drone detecting sensors 380 may attempt to capture electronic signature data from the unauthorized drone device, such as hardware identifiers, RF signal data, and/or heat signatures of the unauthorized drone device. In addition, the one or more drone detecting sensors 380 may take action to thwart the intrusion by the unauthorized drone device. For example, the one or more drone detecting sensors 380 may transmit a signal to another electronic device at or near the property (e.g., a drone device) to initiate a detection signal of the unauthorized drone device, play loud sounds near the unauthorized drone device, shine lights near the unauthorized drone device, output identifying information collected about the unauthorized drone device (e.g., electronic signatures, captured images, etc.), alert a central station operator or first responder about the intrusion, and may take other actions directed to disrupting the unauthorized drone device.

Alternatively, based on a determination that the imaged drone device is a legitimate drone device, the one or more drone detecting sensors 380 may discontinue tracking the legitimate drone device and scan for unauthorized drone devices. The one or more drone detecting sensors 380 also may report the location of the legitimate drone device. The one or more drone detecting sensors 380 further may continue tracking the legitimate drone device and attempt to provide assistance to the drone device. For instance, if the alarm is a fire alarm event, the one or more drone detecting sensors 380 may continuously or periodically update the location of the legitimate drone device to assist another drone devices or first responders in assisting the legitimate drone device, provide audible reminders of what types of actions should be taken in a fire, enable a central station operator or first responder to talk to the legitimate user through a two-way voice communication session established through the monitoring system control unit 310 and the drone device.

In some examples, the one or more drone detecting sensors 380 may be assigned to different areas of the property where the one or more drone detecting sensors 380 can monitor airspace in an unobstructed manner. In these examples, the one or more drone detecting sensors 380 may be assigned to different levels in a property (e.g., a front entrance drone detector and a back entrance drone detector) and even different rooms or sections that are potentially blocked by doors. The monitoring system control unit 310 coordinates tracking based on the assigned areas. For instance, the monitoring system control unit 310 determines areas in or near a property where an event has been detected (e.g., where motion is sensed, where a door or window is opened, etc.) and only controls the devices assigned to the determined areas to operate. In this regard, the monitoring system control unit 310 may use location of users determined using sensors to control operation of the one or more drone detecting sensors 380.

In some implementations, after detecting a drone device at or near the property, the one or more drone detecting sensors 380 may actively impede the operation of the drone device at or near the property. For example, in some instances, in response to detecting the drone device, the one or more drone detecting sensors 380 may enable a RF jamming signal, generate a laser or light signal to impede the detected drone device from navigating at or near the property, generate a blinding light to reduce visibility of the property, or enable an alarm signal to prevent further trespass. In other examples, the one or more drone detecting sensors 380 may transmit signals to the monitor control unit 310 to enable particular actions at or near the property (e.g., lower the shades, close garage door, lock doors, etc.).

The invention claimed is:

1. A monitoring system for monitoring a property, the monitoring system comprising:

one or more processors; and one or more non-transitory storage devices, the one or more storage devices storing instructions that, when executed by the one or more processors, cause the one or more processors to perform operations comprising:

obtaining, by the monitoring system, sensor data from one or more sensors located at the property, wherein the sensor data is indicative of audio signals of one or more drone propellers;

detecting, by the monitoring system and based on the obtained sensor data, presence of a drone;

determining, by the monitoring system and based on the audio signals of the one or more drone propellers, that the detected drone is an unauthorized drone;

monitoring, by the monitoring system, one or more radio frequency (RF) signals being output by the unauthorized drone;

based on the monitoring of the one or more RF signals, determining, by the monitoring system, that the unauthorized drone was already determined to be an unauthorized drone based on the audio signals of the one or more drone propellers, and (i) is communicating or (ii) attempting to communicate with a network associated with the property;

based on the determining that the unauthorized drone was already determined to be an unauthorized drone based on the audio signals of the one or more drone propellers, and (i) is communicating or (ii) attempting to communicate with a network associated with the property, selecting, by the monitoring system, one or more network adjustment policies; and transmitting, by the monitoring system and to one or more monitoring system components, one or more instructions that, when received by the one or more monitoring system components cause the one or more monitoring system component to encrypt wireless communications with other monitoring system components over the network for a predetermined time period, wherein the predetermined time period is based on monitoring the one or more RF signals being output by the unauthorized drone.

2. The monitoring system of claim 1, wherein the one or more sensors located at the property are stationary sensors.

3. The monitoring system of claim 1, wherein the one or more sensors located at the property are mounted to a device that is configured to move over at least a portion of the property.

4. The monitoring system of claim 1, wherein the detecting, by the monitoring system and based on the obtained sensor data, the presence of the drone comprises:

determining, by the monitoring system, that at least a portion of the obtained sensor data satisfies a predetermined similarity threshold when compared to data representing at least one drone attribute.

5. The monitoring system of claim 1, wherein the determining, by the monitoring system and based on the audio signals of the one or more drone propellers, that the detected drone is an unauthorized drone comprises:

generating, by the monitoring system, a drone signature based on the audio signals of the one or more drone propellers; and determining, by the monitoring system and based on the drone signature, that the detected drone is an unauthorized drone.

6. The monitoring system of claim 5, wherein the determining, by the monitoring system, and based on the drone signature, that the detected drone is an unauthorized drone comprises:

determining, by the monitoring system, whether the drone signature is stored in a database of authorized drone signatures; and based on a determination that the drone signature is not stored in the database of authorized drone signatures, determining, by the monitoring system, that the drone represented by the drone signature is an unauthorized drone.

7. The monitoring system of claim 6, the operations further comprising:

obtaining, by the monitoring system, second sensor data that is generated by the one or more sensors;

generating, by the monitoring system, a second drone signature that is based on the second sensor data;

determining, by the monitoring system, whether the second drone signature is stored in the database of authorized drone signatures; and based on a determination, by the monitoring system, that the second drone signature is stored in the database of authorized drone signatures, determining, by the monitoring system, that the drone represented by the second drone signature is an authorized drone.

8. The monitoring system of claim 1, wherein the determining, by the monitoring system, that the unauthorized drone was already determined to be an unauthorized drone based on the audio signals of the one or more drone propellers, and (i) is communicating or (ii) attempting to communicate with a network associated with the property comprises:

providing, by the monitoring system, network traffic data associated with a network of the property as an input to a machine learning model that has been trained to detect irregular network activity, wherein the network traffic data includes at least a portion of (i) data received by a device connected to one or more networks associated with the property or (ii) data that is transmitted by a device connected to one or more networks associated with the property;

obtaining, by the monitoring system, output data that is generated by the machine learning model that has been trained to detect irregular network activity, wherein the output data is generated as a result of the machine learning model processing the provided network traffic data; and determining, by the monitoring system and based on the obtained output data generated by the machine learning model, whether the unauthorized drone is (i) communicating or (ii) attempting to communicate with the network associated with the property.

9. The monitoring system of claim 1, wherein the determining, by the monitoring system, that the unauthorized drone was already determined to be an unauthorized drone based on the audio signals of the one or more drone propellers, and (i) is communicating or (ii) attempting to communicate with a network associated with the property comprises:

determining, by the monitoring system, that a predetermined pool of data that has been allocated as bait for detection of malicious network activity has been accessed.

10. The monitoring system of claim 1, wherein the one or more monitoring system components include (i) one or more monitoring system sensors, (ii) one or more monitoring system cameras, or (iii) a monitoring system control unit.

11. The monitoring system of claim 1, wherein the one or more network components include (i) a smartphone, (ii) a tablet, (iii) a laptop, (iv) a desktop computer, (v) a server computer, or (vi) a router.

12. The monitoring system of claim 1, wherein the network adjustment policies include (i) suspension of all wireless communications by the one or more monitoring system components or one or more network components until the one or more monitoring system components or the one or more network components are instructed to be begin wireless communications again, (ii) suspension of all wireless communications by the one or more monitoring system components or the one or more network components for a predetermined period of time, (iii) suspension of a subset of wireless communications using radio frequencies used by the unauthorized drone by the one or more monitoring system components or the one or more network components, (iv) limiting wireless communications by the one or more monitoring system components or the one or more network components to a subset of predetermined communications, (v) requiring the one or more monitoring system components or the one or more network components to use encrypted communications until the one or more monitoring system components or the one or more network components are instructed to use unencrypted wireless communications, or (vi) requiring the one or more monitoring system components or the one or more network components to use encrypted communications for a predetermined amount of time.

13. The monitoring system of claim 1,
wherein the monitoring system comprises one or more contact sensors that use wired communication;
wherein the selecting, by the monitoring system, one or more network adjustment policies comprises:
selecting, by the monitoring system, a network adjustment policy that suspends wireless communication by one or more other monitoring system components or one or more network components until (i) a predetermined amount of time has expired or (ii) the one or more other monitoring system components or the one or more network components receive an instruction to begin using wireless communication again.

14. The monitoring system of claim 1,
wherein the monitoring system comprises one or more motion sensors that use wired communication;
wherein the selecting, by the monitoring system, one or more network adjustment policies comprises:
selecting, by the monitoring system, a network adjustment policy that suspends wireless communication by one or more other monitoring system components or one or more network components until (i) a predetermined amount of time has expired or (ii) the one or more other monitoring system components or the one or more network components receive an instruction to begin using wireless communication again.

15. The monitoring system of claim 1, wherein the monitoring system comprises one or more contact sensors that use wired communication or one or more motion sensors that use wired communication;
wherein the selecting, by the monitoring system, one or more network adjustment policies comprises:
selecting, by the monitoring system, a network adjustment policy that suspends wireless communications by the one or more monitoring system components or one or more network components located at the property; and
wherein the transmitting, by the monitoring system, one or more instructions to (i) the one or more monitoring system components or (ii) the one or more network components that are configured to adjust network parameters based on the one or more selected network adjustment policies comprises:
transmitting, by the monitoring system, an instruction to a network router to suspend access to one or more wireless networks, generated by the network router, by the one or more monitoring system components or the one or more network components located at the property.

16. The monitoring system of claim 1,
wherein the monitoring system comprises one or more contact sensors that use wireless communication;
wherein the selecting, by the monitoring system, one or more network adjustment policies comprises:
selecting, by the monitoring system, a network adjustment policy that requires the one or more contact sensors to use encrypted wireless communications.

17. A method comprising:
obtaining, by a monitoring system, sensor data from one or more sensors located at a property, wherein the sensor data is indicative of audio signals of one or more drone propellers;
detecting, by the monitoring system and based on the obtained sensor data, presence of a drone;
determining, by the monitoring system and based on the audio signals of the one or more drone propellers, that the detected drone is an unauthorized drone;
monitoring, by the monitoring system, one or more radio frequency (RF) signals being output by the unauthorized drone;
based on the monitoring of the one or more RF signals, determining, by the monitoring system, that the unauthorized drone was already determined to be an unauthorized drone based on the audio signals of the one or more drone propellers, and (i) is communicating or (ii) attempting to communicate with a network associated with the property;
based on the determining that the unauthorized drone was already determined to be an unauthorized drone based on the audio signals of the one or more drone propellers, and (i) is communicating or (ii) attempting to communicate with a network associated with the property, selecting, by the monitoring system, one or more network adjustment policies; and
transmitting, by the monitoring system and to a one or more monitoring system components, one or more instructions that, when received by the one or more monitoring system components, cause the one or more monitoring system components to encrypt wireless communications with other monitoring system components over the network for a predetermined time period, wherein the predetermined time period is based on monitoring the one or more RF signals being output by the unauthorized drone.

18. A non-transitory computer-readable medium storing software comprising instructions executable by one or more computers which, upon such execution, cause the one or more computers to perform operations comprising:

obtaining, by a monitoring system, sensor data from one or more sensors located at a property, wherein the sensor data is indicative of audio signals of one or more drone propellers;

detecting, by the monitoring system and based on the obtained sensor data, presence of a drone;

determining, by the monitoring system and based on the audio signals of the one or more drone propellers, that the detected drone is an unauthorized drone;

monitoring, by the monitoring system, one or more radio frequency (RF) signals being output by the unauthorized drone;

based on the monitoring of the one or more RF signals, determining, by the monitoring system, that the unauthorized drone was already determined to be an unauthorized drone based on the audio signals of the one or more drone propellers, and (i) is communicating or (ii) attempting to communicate with a network associated with the property;

based on the determining that the unauthorized drone was already determined to be an unauthorized drone based on the audio signals of the one or more drone propellers, and (i) is communicating or (ii) attempting to communicate with a network associated with the property, selecting, by the monitoring system, one or more network adjustment policies; and transmitting, by the monitoring system and to one or more monitoring system components, one or more instructions that, when received by the one or more monitoring system components cause the one or more monitoring system components to encrypt wireless communications with other monitoring system components over the network for a predetermined time period, wherein the predetermined time period is based on monitoring the one or more RF signals being output by the unauthorized drone.

\* \* \* \* \*

UNITED STATES PATENT AND TRADEMARK OFFICE
CERTIFICATE OF CORRECTION

| | | |
|---|---|---|
| PATENT NO. | : 11,240,274 B2 | |
| APPLICATION NO. | : 16/230816 | |
| DATED | : February 1, 2022 | |
| INVENTOR(S) | : Matthew Daniel Correnti and Michael Kelly | |

It is certified that error appears in the above-identified patent and that said Letters Patent is hereby corrected as shown below:

In the Claims

In Claim 17, Column 32, Line 53 (approx.), before "one" delete "a".

Signed and Sealed this
Tenth Day of May, 2022

Katherine Kelly Vidal
*Director of the United States Patent and Trademark Office*